July 13, 1954   C. L. HORN ET AL   2,683,515
AUTOMATIC SAFETY GUARD FOR POWER PRESSES
Filed Feb. 18, 1949   4 Sheets-Sheet 1

INVENTORS
CHARLES L. HORN
PHILIP DEJARLAIS
BY
Paul, Paul & Moore
ATTORNEYS

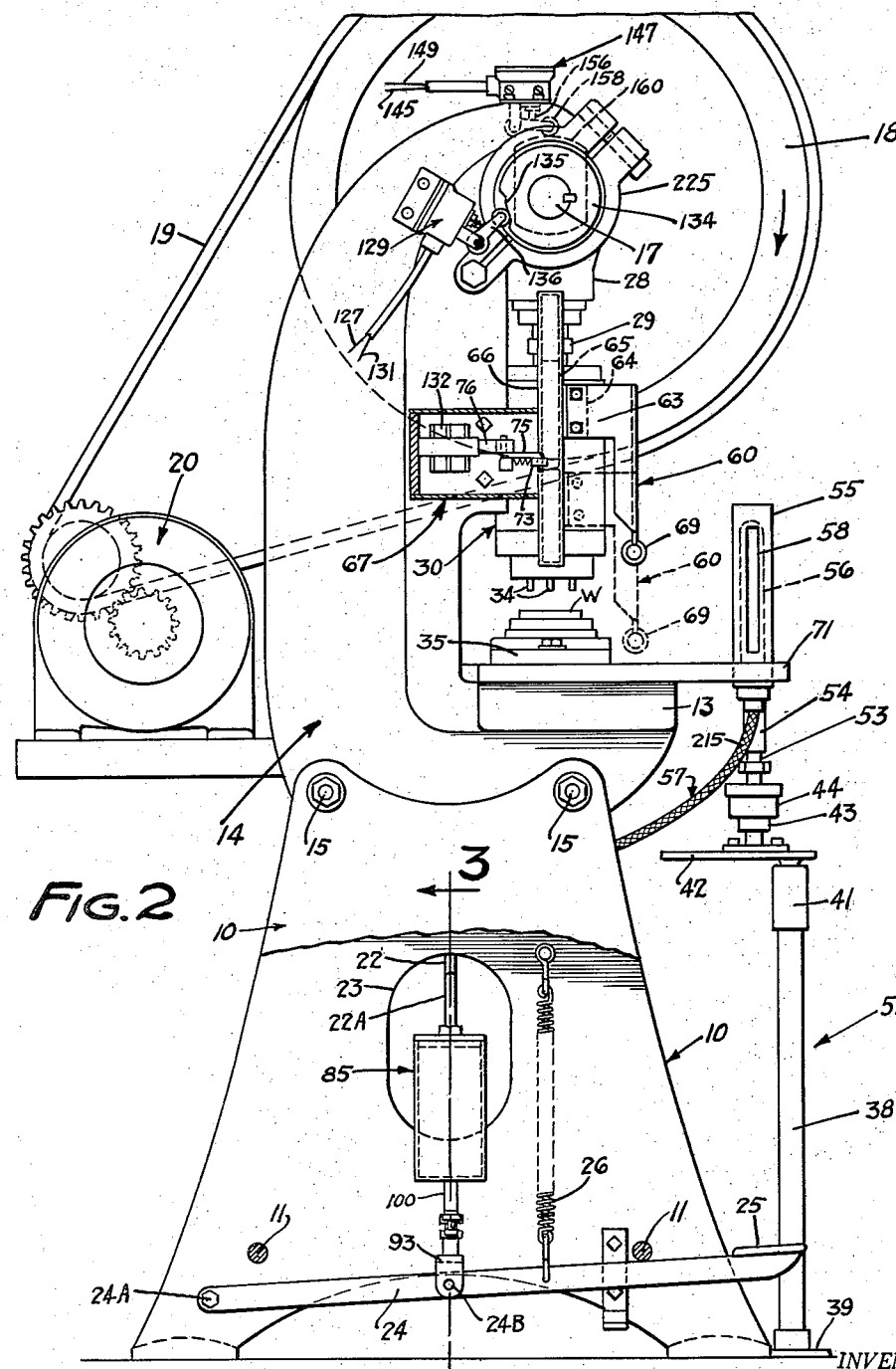

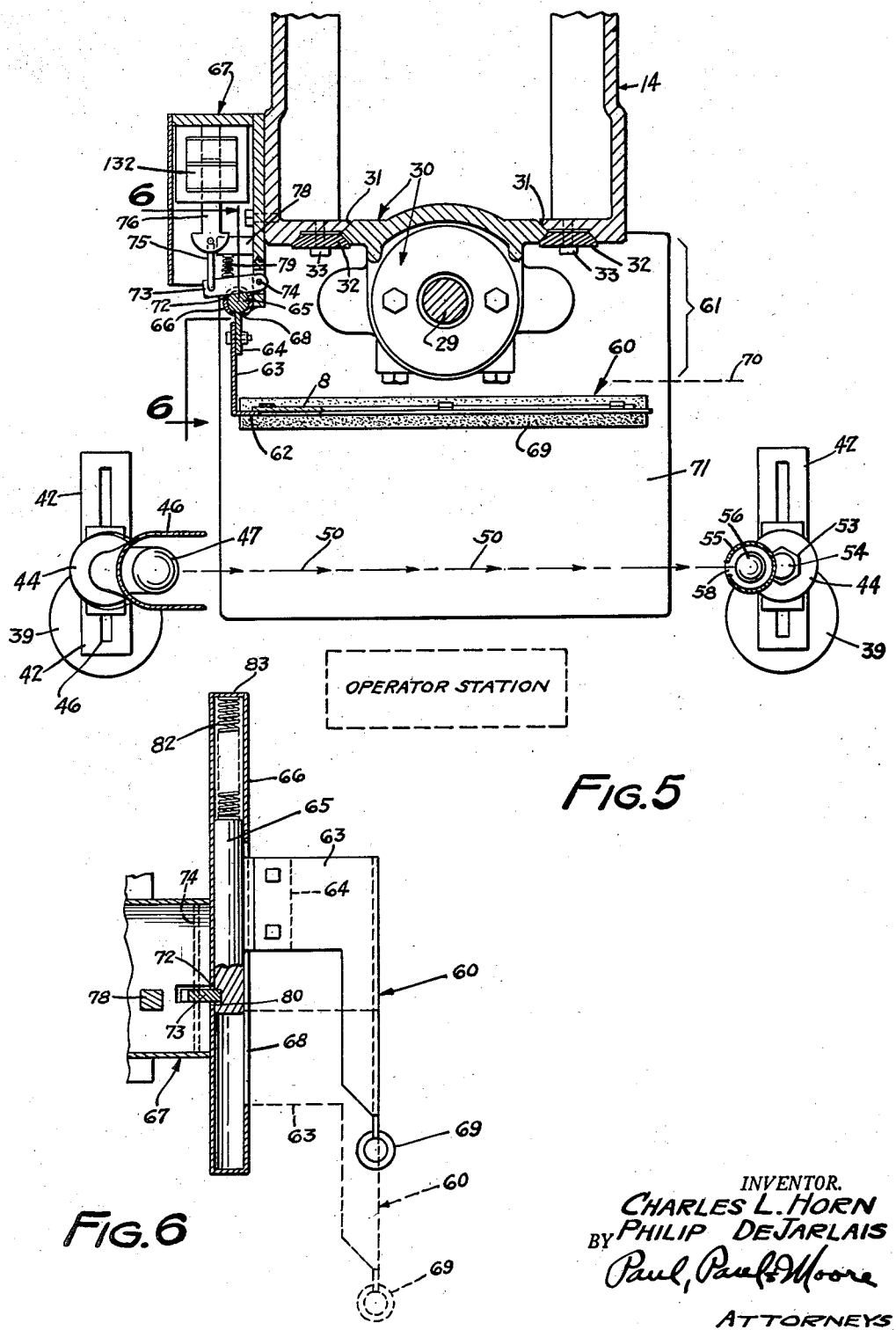

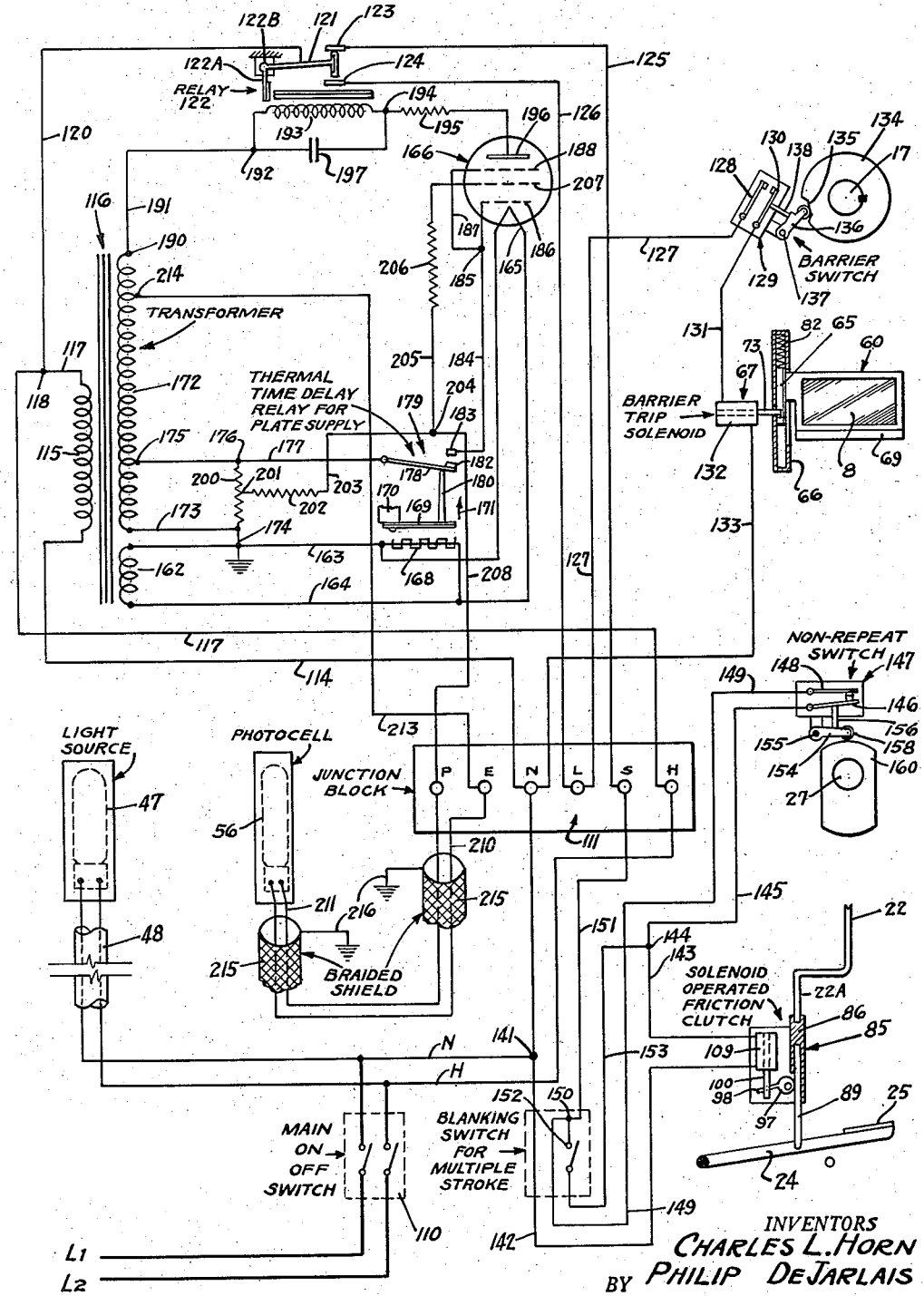

Patented July 13, 1954

2,683,515

UNITED STATES PATENT OFFICE 2,683,515

AUTOMATIC SAFETY GUARD FOR POWER PRESSES

Charles L. Horn, Minneapolis, and Philip De Jarlais, Champlin, Minn., assignors to Hoffman Engineering Corporation, Anoka, Minn., a corporation of Minnesota Application February 18, 1949, Serial No. 77,088

8 Claims. (Cl. 192—134)

This invention relates to an automatic safety guard for power machines, such as power actuated presses, shears, brakes and the like, and more particularly to electrically operated safety guards. In the power machine art, more particularly punch and forming presses and power driven shears, brakes and the like, it is customary to provide a cross head or other element reciprocating in respect to a bed plate and having heavy power actuated machinery for effecting such reciprocation, so as to produce punching, forming, shearing or bending operations in the machine. As usually constructed the machine has a vertically reciprocating cross head actuated by a crankshaft or similar device on which there is mounted a large and heavy flywheel, the flywheel being in turn actuated by an electric motor or other power source. Such machines are constructed so as to include a clutch arrangement between the flywheel and the crankshaft which it drives, so that during such intervals as the machine is not operating, the motor, or other power source which supplies the motivating force, is permitted to build up the speed of the flywheel. When the operator desires to cause the cross head and the tools that it carries to descend upon the bed plate into cooperating position with forming dies on the bed plate, the operator actuates the control, which is usually in the form of a treadle positioned near the base of the press so that it can be actuated by the operator's foot, leaving the operator's hands free to hold or manipulate materials into and out of the press. The clutch then engages and the stored energy of the flywheel causes the crankshaft to turn and the cross head to go through a working stroke, whereupon the clutch is automatically disengaged and the machine thereafter stops in "open" position, unless the operator has held the treadle down, in which case the machine continues on through succeeding complete cycles of operation until the treadle or other operator control is released. Most machines of this type have a brake on the crankshaft to stop the movement of the crankshaft and cross head when the clutch is released. In the usual press, shear or the like, the braking element is adjustable and stays "on," even while the machine is moving through its working stroke. Maladjustment of the braking element can occur and cause stopping at unwanted places and sometimes even permit the press parts to "coast" and close the press after the operator control is released.

In other power presses, power shears, power brakes and the like, the motivating force may be steam, air or hydraulic fluid under pressure, which is valved by a foot treadle to cause actuation of the device.

The foot treadle control has been the cause of endless and very serious accidents because the operators, after some period of work at the machine, tend to become careless and tend to take chances, permitting their fingers or hands to move into the path of actuation of the die, punch, shear or forming element of the machine. Thus, some operators may "ride the treadle" and attempt to time the insertion and removal of materials into and out of the machine in accordance with the speed of the machine, or attempt to manipulate parts into and out of the machine after it has started to move. In addition, faulty brake adjustment frequently occurs, unknown to the operator. As a result, many fingers have been lost and hands and arms seriously injured.

Efforts have previously been made to alleviate this difficulty by providing hand controls which must be actuated by the two hands of the operator and held actuated in order to cause the machine to move. Such controls, while contributing to the safety of the machine, cause serious loss in production because the operator's hands should be free in order to actuate materials into and out of the machine while it is in the course of its operative cycle. Thus, it is desirable that the operator's hands should be free so as to permit him to place the already formed articles or pieces into awaiting bins and to permit him to pick up and ready materials that are to be worked upon in subsequent operations; and for economy of time this should be done while the machine is in the course of its cycle of operation, so as to have the already formed pieces cleared of the machine and to have other unformed pieces ready for insertion into the machine while it is in the course of forming an article. Therefore, two-hand controls for power machines of this character have not been a satisfactory solution of the safety problem, all things considered.

In still other instances safety has sought to be achieved by providing manacles, which are attached around each wrist of the operator, these manacles being connected by short cables or cords which are in turn fastened to mechanical elements having a movement away from the machine during the forming operation of the machine. Such safety devices have the effect of positively jerking the operator's wrists, and hence his hands and arms, away from a dangerous position adjacent to or over the machine bed during the actuating cycle of the machine. These "manacle" devices likewise have certain objectionable features which have prevented their general adoption and use. One of the primary disadvantages of such manacle devices is that the chains or cords which are fastened to straps on the operator's wrists considerably restrict the range of movement of the operator's hands and arms, even in safe areas away from the machine, and accordingly prevent him from performing necessary, desirable and safe work in connection with unloading and preparatory to loading of the machine for ensuing cycles. In addition, such devices have a pychological disadvantage for no free man desires to be "chained" to his machine, and many operators positively refuse to use such devices for such psychological reasons, even though the purpose of the device is admirable. Another and distinct disadvantage of such manacle safety devices is that operators tend to discard the manacles before recesses, the noon lunch hour, and before "quitting time" so as to be ready for a hasty exit from their work. As a result an operator will discard the manacles somewhat before the time to stop work and then, after "washing up," continue to work up to the last minute without putting the manacles on again. It is during these last few minutes that many accidents have occurred simply because the manacles have been discarded for a short time. Thus, such safety devices have not served materially to reduce accidents in connection with the operation of power machines.

There are many other safety devices that have been developed, but these are likewise objectionable from one standpoint or another and because of cost, great complexity, failure of operation, or inherently poor design, and in some instances because of psychological disadvantages, such prior safety devices have not fulfilled the needs for safety in connection with the operation of power machines.

It is an object of the present invention to provide an improved power machine safety guard of entirely automatic operation so constructed that the operator's hands are left entirely free to perform necessary work and yet made so as positively and automatically to guard against entrance of the operator's hands into the zone of danger of the machine.

It is a further object of the invention to provide an improved guard which leaves the area between the operator and work area of the machine entirely free for movement of the operator's hands into that dangerous area of the machine during such times as the machine is not in the course of its operating cycle and yet to provide a positive guard against movement of the operator's hands into that dangerous area should he attempt to do so when the machine is in its cycle of operation.

It is a further object of the invention to provide an improved automatic safety guard for power machines designed for the purpose of preventing physical injuries to operators.

It is another object of the invention to provide an improved automatic safety guard for power machines which is photoelectrically actuated and provided with adequate safety controls so that the entire mechanism remains in the safe position upon any failure of the controls of the guard.

Another object of the invention includes the provision of a positive guard of the fence type movable into and out of guarding position automatically when the operator's hands move toward the danger area of the machine during the working cycle of the press.

Other and further objects of the invention are those inherent in the apparatus herein illustrated, described and claimed.

In the drawings and description hereinafter given, the invention is shown as applied to a common form of small power press, but it should be understood that the illustrated installation is not a limitation upon the usefulness of the invention which is applicable with equal facility and usefulness to power presses of other design, as well as to power shears, power brakes and the like, whether driven by flywheels or by air, steam or hydraulic pressure. With this understood, the invention is herein illustrated with reference to the drawings in which corresponding numerals refer to the same parts and in which Figure 1 is a front elevational view of an illustrative power press to which the automatic safety guard of the present invention has been applied, and showing said automatic safety guard in front elevation;

Figure 2 is a side elevational view corresponding to Figure 1, with certain parts broken away and partly in section, taken along the line 2—2 and in the direction of arrows 2—2 of Figure 1;

Figure 5 is a fragmentary horizontal sectional view of the press and automatic safety device thereon taken along the line and in the direction of arrows 5—5 of Figure 1;

Figure 6 is a fragmentary side elevational view, partly in section, of a portion of the barrier guard mechanism, taken along the line and in the direction of arrows 6—6 of Figure 5;

Figure 7 is a wiring diagram of the apparatus showing some of the controlled and controlling elements in fragmentary view and connected to the appropriate portions of the wiring circuit of the device.

Figures 1, 3, 4:
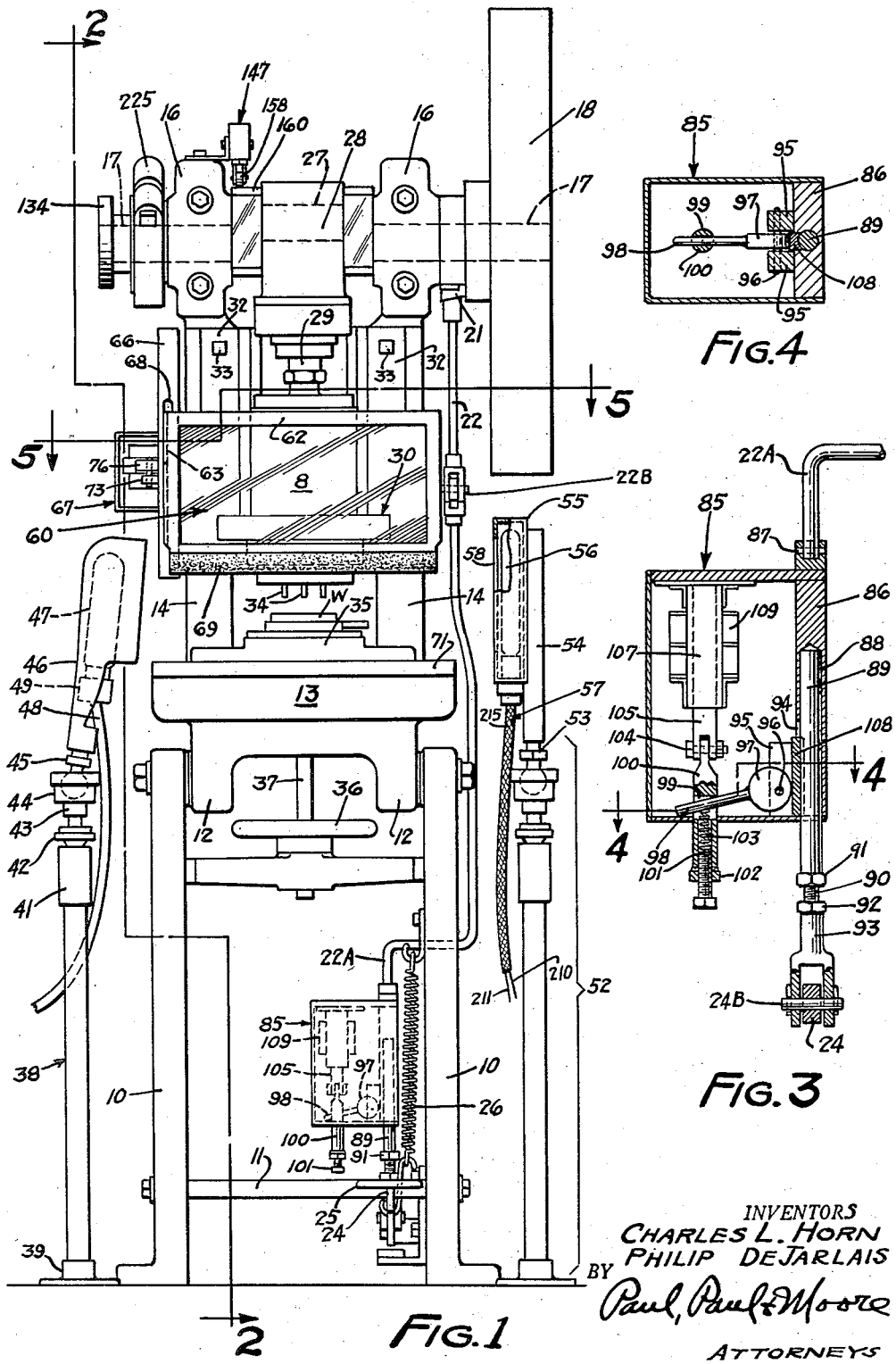
Figure 3 is a fragmentary sectional view of a portion of the invention, namely the solenoid operated friction clutch, taken along the line and in the direction of arrows 3—3 of Figure 2.
Figure 4 is a fragmentary transverse sectional view of the solenoid operated friction clutch taken along the line and in the direction of arrows 4—4 of Figure 3.

Referring to the drawings, a press of conventional design is illustrated in connection with the instant invention, this press being a punch press or forming press. It is to be understood, as hereinbefore stated, that the machine herein shown is merely illustrative and that the automatic safety control is shown thereon merely for illustrative purposes and that the automatic safety guard is not limited to use with the specific machine shown.

The illustrative press has a base composed of spaced leg frame members 10—10 that are attached together adjacent the floor level by a pair of through bolts 11—11 and are attached at their upper ends to the downwardly extending lugs 12—12 of the C-frame of the press generally designated 8. The press bed 13 is carried by the C-frame generally designated 14, and the method of attachment of the leg members 10—10 to the C-frame 14, by means of bolts 15—15, and clamping wheel 36 and rod 37, is such as to permit angular adjustment of the press bed 13 so as to permit the bed 13 to be placed at a level position or tilted forwardly or backwardly, so as to accommodate a variety of punch press and forming operations.

The C-frame 14 is provided at its upper end with journals 16—16 through which a crankshaft generally designated 17 extends. The crankshaft extends to the right, as shown in Figure 1, and at its outer end and journaled thereon is mounted a heavy flywheel 18 which is driven by a plurality of V-belts 19 from a power source, in this instance a geared motor power unit 20, although it is to be understood that any suitable power source may be utilized for driving the press. The flywheel 18 is adapted to be engaged by the crankshaft 17 by a standard clutch mechanism not illustrated, mounted within the flywheel and provided with an actuating dog 21, Figure 1, that is controlled by a vertical pull rod 22 extending downwardly in the normal press alongside the C-frame 14 and through the hole 23 in the right-hand base member 10 and thence downwardly at 22A to a treadle lever 24 that is hinged at screw 24A at the back part of the right-hand base member 10, Figures 1 and 2. The rod 22, in some presses, is connected through a force multiplying lever 22B, although not always. The operator control treadle or lever 24 extends forwardly and is provided with a foot piece 25 and is normally lifted upwardly by the spring 26 against the front tie-rod 11, as shown in Figure 2. This construction, just described, is for the normal press in which actuation of the treadle 24—25 at any time causes operation of the clutch rod 22 and hence the clutch actuating dog 21 under full control of the operator. Likewise, in the usual press the clutch dog 21 is moved to disengaged position by means of cams, not shown, when the crankshaft has made one revolution. The rod 22 is normally pulled up (to clutch disengaging position) by means of springs, not illustrated, which in some presses is a compression spring and in other presses a tension spring. As will hereinafter be explained in greater detail, in accordance with this invention there is provided an automatically actuated coupling and uncoupling element 85 between the lever 24 and the clutch pull rod 22A, this element being herein designated as a "solenoid operating friction clutch" which is element 85. The device 85 serves to disconnect the foot treadle 24—25 from the clutch pull-down rod 22-22A, unless the operator's hands are clear of dangerous position. This actuation and the apparatus by which it is achieved will be described hereinafter.

Referring again to the press mechanism, the crankshaft 17 has a center crank portion 27 in Figure 1 to which the upper end of a short connecting rod 28 is attached, the connecting rod extending downwardly through the adjustment coupling at 29 to a cross head 30 that moves up and down in the V-shaped ways 31—31 in the press frame, the ways being best illustrated in Figures 1 and 5. The ways 31 are, as is usual, provided with removal plates 32—32 which are held in place by cap screws 33—33 so as to permit the cross head 30 to be replaced and adjusted. The screw 29 in the connecting rod 28 permits vertical adjustment of the way 31 so as to allow adjustment of the press. When the crankshaft 17 rotates the cross head 30 is accordingly actuated down and up and on the downstroke the tools mounted on the cross head, here illustrated as a plurality of punches 34, are brought downwardly upon the die 35 mounted upon bed 13 so as to cause a work operation on the material W that is placed on the die held on the bed plate 13. The adjustment wheel 36 and screw 37 are usual parts of the press and are provided for allowing tilting of the press. A brake 22S of the constant friction type rides on a brake area of the crankshaft and serves to stop the press when the clutch within flywheel 18 is released.

All of the mechanisms just described, with the exception of element 85, are illustrative of the normal power press in which treadle actuation causes the flywheel 18 to be engaged to its crankshaft 17, thereby to cause movement of the press from the up to the down position and thence up again where, if the treadle has been raised, the cross head stops automatically due to the mechanical functioning of the press. Should the operator maintain his foot on the control treadle 24—25, the press will continue through a second and subsequent cycles until the operator removes his foot from the press.

The automatic safety guard of the present invention that is applied to a power press herein illustrated includes a light stand 38, Figure 1, that is provided with a base flange 39 by which the stand 38 may be attached to the floor on which the press is mounted. At the upper end of the stand 38 there is a sleeve 41 terminating in a slotted plate 42, Figures 1-5, to which the base member 43 of a ball and socket joint 44 is attached. By means of the slot 46 in the member 42 the ball and socket stand 43—44 can be adjusted fore and aft in respect to the press, Figure 5, so as to permit universal installation of the automatic safety guard of the present invention with presses of all designs and types. Upon the upper portion 45 of the ball and socket joint 44 there is mounted a light housing 46 containing an ordinary incandescent lamp 47. A suitable electrical cord connection 48 is connected to the socket 49 into which the light 47 is screwed and by rotation of the ball and socket member 44 with reference to the member 43 the ball portion 45 can be clamped, positioning the incandescent lamp 47 and lamp housing 46 at any angular position and direction with reference to the press. It is preferred that the adjustment be approximately as shown in Figure 5 so that the light emanating from the lamp 47 traverses a path directly across the front of the press, as indicated by the arrows 50, thus forming a light screen between the operator and the dangerous area 61 of the press. At the right side of the press, as shown in Figure 1, there is a similar stand shown opposite the bracket generally designated 52, the stand 52 being the same or similar to the stand 38—45, previously described. In this instance, however, the member 53 of the right-hand stand carries a post 54 upon which a housing 55 is mounted. The housing 55 serves to enclose one or more photocells 56 which are connected by a shielded cable 57 to the control apparatus of the device, as hereinafter described. The housing 55 has a vertical aperture 58 at one side and this aperture is adjusted so that it points towards the light source 47. Thus, when the operator's hands do not intercept the light beam (light screen) which passes across the front of the press in the direction of arrows 50—50, Figure 5, the light falls upon the photocell 56, but when the operator moves his hands towards the press sufficiently to cut off even a slight amount of light moving through the vertical plane (or light screen), defined by arrows 50—50, a darkening of the photocell or cells 56 occurs and this causes actuation of electronic devices which serve to drop a press guard generally designated 60 into the path of movement of the operator's hands towards the danger area shown opposite the bracket 61 of Figure 5, and thus the operator's hands are positively prevented from movement into the danger area. The positions of light source 47 and photocell 56 may be exchanged and their spacing widened, to accommodate different situations so long as the light screen 50—50 is maintained across the press between the operator station and the danger area of the press.

The press guard 60 is in the form of a vertical plate extending across the front of the press directly in front of the vertically actuated cross head 30 and the die plate 35. The guard plate 60 is preferably made in the form of a framed window 8 having a metal window frame 62 around a transparent sheet of plastic, so as thereby to permit the operator to see through the guard and observe press operation. A plain, unframed, husky sheet of plastic can also be used. The frame 62 or plastic sheet has a rearwardly extending member 63 which may be at the right or the left end, as illustrated, the member 63 being a supporting arm that is attached to the forwardly extending flange 64 on a vertically movable rod 65 that moves up and down in a tubular guide 66 attached to the barrier trip assembly case generally designated 67. The vertical cylindrical guide 66 has a slot 68 in its front which thereby holds the mid-flange 64 in a position so that it is forwardly directed at all times and this in turn holds the supporting arm 63 of the vertically movable window guard 60 which is otherwise unsupported. The guard plate 60 is preferably provided with a soft rubber pad 69 along its lower edge, so that if the guard should descend as the operator's fingers reach a position under the guard, the fingers will not be injured. Ordinarily, the guard operates fast enough so that the operator's fingers do not reach the vertical plane of the guard before it has already descended, but if an operator should attempt to beat the safety mechanism and his fingers reach, for example, the line 70, Figure 5, the guard will descend on top of the fingers and drive them onto the table 71 on the bed 13 of the press, thereby holding the fingers in a position on the table safely away from the danger area 61.

The slotted cylindrical guide 66 of the barrier trip mechanism 67 has a transverse slot 72 in its rear portion into which there may extend a latch member 73 that is attached to the barrier guard frame 67 by means of a pivot pin 74. The latch 73 is coupled by means of a link 75 which is pivoted to the latch at its front end and pivoted at its rear end to the core 76 of a solenoid 132 in the barrier trip mechanism. An internal frame member 78 in the barrier guard mechanism serves as a stop against which a compression spring 79 bears, the front end of the spring being in engagement with the rear surface of the latch 73, thereby normally forcing the latch, link 75 and solenoid core 76 forwardly to the position shown in Figure 5, in which position the latch 73 engages a notch 80 in the vertically movable rod member 65 that carries the guard plate 60. The latch 73 thus normally holds the cylindrical rod 65 in its raised position, where it is lifted by the operator in setting the press prior to operation, but when the solenoid 132 is energized, the core 76 is retracted, and this moves the latch 73 out of the notch 80 against the force of spring 79. When this occurs the cylindrical rod member 65 is forcibly driven downwardly in the guide 66 by means of a spring 82 that is positioned in the upper portion of the guide and held by the end cap 83. Hence, when the latch 73 is retracted, as described, the member 65 is moved downwardly with a snap and this moves the guard plate 60 downwardly quickly into a position to guard against movement of the hands of the operator into the danger zone 61, and if perchance the operator has moved very quickly his fingers will be pinned under the soft padding 69 at the bottom of the guard 60, but nonetheless in a safe position.

Referring to Figures 1, 3 and 4, the solenoid operated friction clutch generally designated 85, previously referred to, has a thickened frame member 86, the upper end of which is attached by pin 87 to the lower end 22A of the clutch control rod 22. The frame member 86 has a vertical hole drilled in it at 88 to receive a cylindrical slide bar 89 which is attached by means of the adjustment screw 90 and lock nuts 91—92 to the clevis 93 which is in turn pivotally attached by means of pin 24B to the operator treadle lever 24. The entire mechanism floats up and down. The member 86 of the solenoid operated friction clutch is provided with a slot at 94 and a pair of lugs 95—95 which serve as a mounting for the pivot pin 96 upon which the eccentric locking lever 97—98 is mounted for eccentric pivotal movement of the portion 97 about the axis of the pin, the lever 97 being provided at its outer end with a rod-like extremity 98, which extends through a slot 99 in the vertically movable member 100. The member 100 is bored out at its lower end and threaded to receive an adjustment screw 101 which is held in adjusted position by means of a lock nut 102, the screw 101 serving as an adjustable stop for a compression spring 103 which thereby holds the rod-like extremity 98 within the slot 99. The upper end of the member 100 is pivotally attached by means of the bolt 104 to the lower end of a solenoid core 105 which moves vertically in the solenoid assembly 107. The eccentric portion 97 of the locking lever 97—98 bears against a locking plate 108, which has a cylindrical edge groove, as shown in Figure 4, so as to provide an area of contact against the vertically movable rod 89. When the coil 109 of the solenoid 107 is energized the core 105 is lifted, thereby moving the member 100 upwardly. This causes the eccentric portion 97 to clamp against the locking plate 108, which in turn bears against and immovably locks the rod 89 from sliding in the member 86. It will be noted that the solenoid core 105 has freedom of movement so that it can pull to home position in the solenoid 107 without applying undue pressure upon the lever 97—98 due to the springiness of the connection provided by the spring 103. As a result the actuation of solenoid 107 applies enough pressure on the locking plate 108 so as to lock the rod 89 in member 86 but insufficient pressure is applied to cause damage to the mechanism, and the degree of pressure may be adjusted by turning screw 101. When the solenoid 107 is thus energized, rod 89 is in effect attached to member 86, and through it to the clutch pull rod 22A—22, and if the operator lever 24—25 is then pushed downwardly, the lever motion is transmitted to the rod 22A and hence through rod 22 and any connection 22B that may be a part of the press to the clutch operating dog 21. However, in the event the solenoid coil 109 is not energized, the rod 89 is not locked to the member 86 and even though the operator lever 24—25 is actuated, no downward pull is exerted upon the clutch operating rod 22, thereby sparing the clutch and also the press from operation. It may be noted in passing that the rod 22 is normally drawn upwardly by a spring, not illustrated, which is a part of the press mechanism. Hence, rod 22 normally stays in the up position unless moved downwardly. The operator lever 24 is also normally pulled upwardly by the spring 26. However, unless solenoid winding 109 is actuated, the operator will be unable to actuate the press.

Referring now to the wiring diagram shown in Figure 7, the circuits and certain additional elements of the apparatus are as follows:

Power is supplied from alternating current line L1 and L2 through a main on-off control switch 110 to the lines N and H of the apparatus. These lines are connected to the correspondingly designated terminals N and H of a junction block 111. Lines N and H are also connected to a light source 47 through the cable 48 previously referred to. From terminal N on the junction block 111 a circuit extends through line 114 to one side of a primary coil 115 of the transformer generally designated 116, the other terminal of this primary winding being connected through line 117 and junction 118 to terminal H on the junction block 111. From junction 118 on line 117, a circuit extends through line 120 to the movable contact 121 of a relay generally designated 122, which has a back contact 123 and a front contact 124. The movable contact is carried by an armature 122A pivoted at 122B, so that when energized, the armature moves to the right in Figure 7 and closes contact 121 on contact 123. When relay 122 is de-energized contact 121 closes onto contact 124 and breaks from contact 123. The back contact 123 is connected through line 125 to terminal S on junction block 111. From the front contact 124 a circuit extends through line 126 to the terminal L on the junction block 111, and thence through line 127 to one terminal 128 of the barrier switch generally designated 129, the other terminal 130 of the barrier switch being connected through line 131 to the coil 132 of the barrier trip solenoid mechanism 67 previously described. From the opposite terminal of the coil 132 a line 133 extends to the supply line terminal N of the junction block 111.

Referring again to the barrier control switch generally designated 129, this switch is mounted conveniently in respect to the crankshaft 17 or any other part moved thereby so as to be actuated by a cam 134 or similar mechanism mounted concentrically with the axis of crankshaft 17 so as to rotate with the crankshaft. The cam 134 has only one low spot 135 which is located so that it permits the roller on lever 136 of the barrier switch 129 to recede to the position shown in Figure 7 when the cam 134 is in the position shown, i. e. the press-open (safe) position, which is the position when the crankshaft 17 has stopped in the upper position with the cross head 30 of the press raised above the press bed. When the crankshaft 17 rotates, the cam 134 is also rotated and immediately upon rotation the lever 136 of the switch 129 is pivoted about the pin 137 and by means of the push rod 138 causes the contact 139 of the switch to be closed against the contact 128 thereby establishing a circuit between lines 127 and 131. From terminal N on the junction block 111 a circuit also extends through line N to junction 141 and thence through line 142 to one terminal of the coil 109 of the Solenoid Operation Friction Clutch mechanism generally designated 85, previously described. From the opposite terminal of coil 109 a line extends at 143 through junction 144 and line 145 to the movable contact 146 of the non-repeat switch generally designated 147 and thence through the cooperating contact 148 and line 149 to junction 150 and thence through line 151 to terminal S on the junction block 111. From junction 150 on line 151 a circuit also extends through the switch 152, which is a blanking switch which, when closed, permits multiple stroke operation and the circuit extends through the switch 152 and line 153 to junction 144 on line 145. It will thus be observed that the circuit through blanking switch 152 is in parallel with the circuit through the non-repeat switch 147 and when the blanking switch 152 is closed it in effect takes out of operation the non-repeat switch 147.

The non-repeat switch 147 is similar to the barrier switch 129 previously described and has an actuating lever 154 that is pivoted at 155 so that when it is moved upwardly, as shown in Figure 7, and a push rod 156 which lifts the movable contact 146 against the stationary contact 148 of the switch. The lever 154, which is provided with a roller 158 at its outer end, is mounted conveniently on the press so as to be actuated once for each revolution of the crankshaft 17. In the illustrated embodiment the entire switch 147 is mounted, as shown in Figure 1, so that the roller 158 is actuated by one of the lobes 160 on the crank portion 27 of the press. Thus, when the crankshaft 17 is in a position such that the cross head 30 is in its uppermost (safe) position, the lobe 160 of the crank portion 27 closes the non-repeat switch 147 but as soon as the crankshaft 17 rotates slightly from the upper position the non-repeat switch is open.

The barrier switch 129 and the non-repeat switch 147 can be mounted at a variety of places on the press and the chosen position is such that minimum modification of the press is needed for installation. It is only essential that the barrier switch be closed whenever the press moves from its fully open position and that the non-repeat switch be opened whenever the press moves from its fully open position. Accordingly, the place of mounting of these switches can be varied considerably in various presses and such a variety of mounting is contemplated and is within the scope of the invention.

Referring again to the wiring diagram, Figure 7, the transformer 116 includes a filament secondary 162 which is connected through lines 163 and 164 to the filament 165 of an amplifier generally designated 166. The filament lead 163 branches, one branch being through the filament 165 and thence to line 164 and the other branch through heater coil 168 which is mounted adjacent a bimetallic strip 169 fastened to a suitable framework 170 so that when heated the bimetallic strip 169 will be flexed in the direction of arrow 171. The transformer 116 also includes a secondary 172, one tap 173 of which is connected to ground at 174. Tap 175 of the transformer winding is connected through junction 176 and line 177 to the movable contact 178 of the relay generally designated 179, which is a thermal time delay relay for closing the plate supply to the tube 166 after the filament 165 has become sufficiently hot. The movable contact 178 is raised by a push rod 180 that is in turn raised by the outer movable end of the bimetallic strip 169, when the latter is heated due to the heat from coil 168 in the filament circuit. Accordingly, when thus raised the contact 182 of strip 178 is closed against the contact 183 and the circuit extends via line 184 and junction 185 to the cathode 186 of the tube 166. Junction 185 is connected through line 187 to the screen grid 188 of the tube 166. The terminal 190 of the transformer winding 172 is connected through the line 191 and junction 192 to a terminal of winding 193 on the relay 122, previously referred to, the other terminal of the relay being connected at 194 through resistor 195 to the plate 196 of the tube 166. Between terminals 192 and 194 there is connected a condenser 197. From terminal 176 on line 177 (connected to the tap 175 of the transformer secondary 172) there is attached a resistor 200, the other terminal of which is connected to ground at 174. From an intermediate tap 201 on the resistor 200 a circuit extends through the resistor 202 and line 203 to terminal 204 which is connected through line 205 and resistor 206 to the control grid 207 of the tube 166. From the terminal 204 just referred to a circuit also extends through line 208 to terminal P on the junction block 111 and thence through shielded line 211 to the cathode of the photoelectric cell 56. From the anode of the photoelectric cell, line 210 extends to terminal E on the junction block 111 and thence through line 213 to tap 214 on the secondary winding 172 of transformer 116. The lead wires 210 and 211 by which the photocells are connected to the junction block terminals P and E are completely shielded by the braided metallic shield 215 which is grounded at both ends, as shown at 216. This serves to prevent extraneous electrical impulses from being applied to the sensitive circuit of the photocell prior to the entrance of the circuits 210—211 into the junction block of the apparatus. In this connection it will be noted that the entire amplifying and control apparatus and junction block portions of the device are shielded by a suitable casing not illustrated, as is usual practice in electronic devices.

A plurality of photocells connected in series may be substituted for the photocell 56 and if desired a plurality of light sources may be located at various parts of the press and each arranged to project a light path across which the operator, or operators if there are two or more, must move in operating the press. For each there would then be provided a photocell. The photocells would then be connected in series and then to the amplifier. Accordingly, all operators would have to be clear before the press could be started and interception of any of the light beams by any operator would trip the barrier guard, as hereinafter explained in detail.

*Operation*

The operation of the circuits is on the principal that tripping of the safety barrier 60 and movement thereof to guarding position is occasioned not only by the action of the operator placing his hands in the path of the protective light screen 50—50, but also occurs when there is any failure of circuits involved and for other reasons, as more particularly pointed out in the following description. The operation of the circuit is as follows:

If it is assumed that the main on-off switch 110 is closed, power is delivered by lines $L_1$ and $L_2$ to the system lines N and H. Accordingly, the light source 47 is energized and will project a plane of light (light screen) across the front of the press to the photocell 56, which is accordingly illuminated. The application of power to lines N and H also energizes lines 114—117 and hence energizes the primary winding 115 of the transformer 116. The induced voltage at 162 applied through lines 163—164 to the filament 165 of the amplifier tube 166 causes the filament to heat. The tube 166 is of the grid-controlled gas-filled type (thyratron type) and the application of plate potential to the tube simultaneously with the application of filament potential would produce short life in the tube. To alleviate such results the thermal time delay relay 179 is included. Accordingly, after filament current has flowed through the heating resistor 168 for a short period of time, the bimetallic strip 169 is heated and flexes upwardly in the direction of arrow 171, thus raising the contact 182 through the intermediary of the push rod 180, thus closing contact 182 on the contact 183 and thereby applying the potential of tap 175 through line 177, contacts 182—183 to the cathode 186 of the control and amplifier tube 166. The cathode-anode circuit continues from anode 196, resistor 195, the coil 193 of relay 122, thence through junction 192 and line 191 to the terminal 190 on the transformer secondary winding 172. This flow of current through the thus energized winding 193 of relay 122 causes the relay armature 122A to be drawn to the right about pivot 122B and it accordingly raises the contact 121 into engagement with the contact 123, thereby establishing a circuit from the line H and terminal H of junction block 111, through line 117, junction 118, line 120, contacts 121—123, line 125, to terminal S on junction block 111, thence by line 151 through junction 150 and line 149 to contact 148 on the non-repeat switch 147 and thence through contact 146 on the same switch and line 145, junction 144 and line 143, through the coil 109 of the solenoid operated friction clutch and thence by way of line 142 to junction 141 on power supply line N. The solenoid operated friction clutch 85 is accordingly energized and effectively connects the treadle 24—25 to the clutch control rod 22. It will be noted, however, that the energization of the solenoid operated friction clutch does not initiate the operation of the machine for the operator causes such action by pushing down on the treadle lever 24—25. This downward pull is transmitted through the solenoid operated friction clutch members 89 and 86 to the clutch control rod 22A—22. This action trips the clutch, not illustrated, within the flywheel 18 and the flywheel then turns the crankshaft 17 and causes the press to begin its downward travel at the beginning of its cycle of operation.

As the crankshaft 17 turns, the cam 134 also turns and after a few degrees of rotation of the crankshaft and cam the barrier switch contacts 128—130 are closed. This prepares a circuit to the barrier trip solenoid 132 but the circuit is not completed unless the photocell is darkened by the operator placing his hand, arm or some obstruction in the path of light screen 50—50 between the light source 47 and a photocell 56. It will also be noted that immediately after the crankshaft 17 begins to turn the non-repeat switch 147 is opened due to the fact that the crank portion 160 leaves contact with the roller 158 of the non-repeat switch, thereby permitting contact 146 to move away from the contact 148. The effect of opening this circuit is to deenergize the circuit to the winding 109 of the solenoid operated friction clutch 85, just described, and the member 89 of that clutch is thereby uncoupled from the member 86 and the foot lever 24—25 thereby is no longer operatively connected to the clutch control rod 22—22A. As a result the operator cannot, by holding down on the treadle 24—25, cause the press to go through repeated operations because the press must stop at its raised position (so as thereby to close the non-repeat switch 147) and the treadle 24—25 must then be in the raised position to obtain a new grip and permit a succeeding actuation of the clutch rod 22.

When it is desired to blank out the operation of the non-repeat switch it is only necessary to close the blanking switch 152 which in effect short circuits the non-repeat switch 147. In such case the solenoid operated friction clutch remains energized so long as the relay 122 remains energized and the clutch is accordingly under the control of the operator under such conditions. This is useful for certain types of press operations.

If it is assumed that the operator attempts to reach towards the danger zone 61 of the press after the press has begun its cycle of operation (and hence has closed the barrier switch 129), the operator's hand, upon reaching the plane of the light screen 50—50 between the light source 47 and photocell 56, will cause a decrease in light to the photocell 56. This decreases the voltage applied to the control grid 207 of the amplifier tube 166 and the tube 166 accordingly becomes non-conductive. In this connection it will be noted that the tube 166 becomes conductive or non-conductive (depending upon the voltage of grid 207) on each positive half cycle of alternating current applied across the cathode-anode circuit of the tube. The tube, of course, does not conduct during the negative half cycle of the alternating potential applied to the cathode-anode circuit. Therefore, if it is assumed that the photocell is darkened and the grid 207 is thus made more negative, the tube 166 fails to conduct even during those half cycles when the potential across the cathode-anode circuit is appropriate for such conductive action and therefore the relay winding 193 of relay 122 is de-energized and permits the armature 122 to move to the left, as shown in Figure 7, thereby allowing contact 121 to open away from contact 123 and to close upon contact 124. As contact 121 breaks from contact 123 the circuit previously described to the solenoid operated friction clutch is broken, but this has no effect at this time due to the fact that the press, in starting its cycle of operation, has already opened the non-repeat switch 147 (assuming the blanking switch 152 is likewise open). However, the closure of contact 121 upon contact 124 does establish a circuit from supply terminal H of junction block 111 through line 117, junction 118, line 120, contacts 121—124, line 126 to terminal L of junction block 111 and thence through line 127 and through the then closed barrier switch contacts 128—130 and line 131 through the barrier trip solenoid winding 132 and line 133 to the opposite supply terminal N of the junction block 111. This causes the energization of the barrier trip solenoid winding 132 and actuates the solenoid, thereby withdrawing the latch 73 which up to this time has supported the rod 65 on the barrier gate mechanism 67. The withdrawal of the latch 73 from its rod-supporting position permits the rod 65 to be moved rapidly downwardly under the influence of spring 82, thus positively and very rapidly forcing the entire guard 60 downwardly in the path of movement of the operator's hands towards the danger area 61. As previously described, if the operator's hands have happened to reach slightly past the vertical plane of the guard 60 they will be pushed downwardly by the soft rubber padding 69 at the bottom of the barrier guard 60 and held against the table portion 71 of the press bed 13, which hence keeps the operator's hands out of the danger area 61. In this way any operator who carelessly or purposefully attempts to "beat the press" and make an adjustment or change of the articles on the press after the press has started its cycle of operation, is positively prevented from doing so by means of the barrier guard.

In the event there should be failure of the amplifier tube 166, the relay winding 193 becomes de-energized and the relay 122 accordingly moves to the de-energized position in which contact 121 is not against contact 123. The solenoid operated friction clutch therefore cannot be engaged by actuation of the foot treadle by normal operation. If under these conditions the operator should pry the clutch mechanism to engage the clutch and start the press, the barrier gate will be tripped and will descend as soon as the press mechanism moves far enough to close cam switch 129.

Referring to Figure 1 adjacent the cam 134 there is illustrated the adjustable brake 225 which rides upon an enlarged portion of the crankshaft 17. In many types of presses the brake 225 is of the type which is constantly tensioned so as to apply constant braking force upon the crankshaft even during the motion of the crankshaft during press operation. This is on the theory that it is better to have the power work against the brake during the press operation than to take a chance that the brake would fail to stop the crankshaft when the clutch is disengaged. The brake 225 is adjusted so that when the clutch within the flywheel 18 is disengaged at the completion of a stroke, the brake is at least supposed to stop the crankshaft 17 within a predetermined few degrees of angular rotation after the clutch is automatically disengaged by a mechanism within the press, as is well known in the art. However, if the brake 225 should be out of adjustment and the crank should "coast," the press may start to descend. There have been instances where the brake 225 was sufficiently out of adjustment so that the press would coast along after the clutch was disengaged and the working punches or dies on the press brought into engagement with the lower dies on the bed 13, thus raising a serious hazard to the operator who might be relying upon the brake operation. In accordance with the present invention if the brake 225 is out of adjustment sufficiently to permit the crankshaft 17 to coast beyond the angularity of the low spot in cam 134, Figure 7, the barrier switch 139 will be closed and as a result any subsequent movement of the operator's hands toward the press (which may be assumed to be stopped) for inserting or replacing articles to be worked upon, will immediately cause the barrier trip solenoid to be energized and the barrier 60 to be lowered into the path of motion of the operator's hands. This condition immediately warns the operator that the press is out of order and should be readjusted.

The ball and socket joints 43—44—45 on the light stand 38 and the corresponding ball and socket joints on the photocell stand 52, together with the slotted adjustment 42—46 of these stands permit the universal application of the light source and photocell alongside of the press, regardless of the angle of tilt of the press, width of the press, interfering machinery and the like. Thus, as the press is tilted, the plane of light between the light source and photocell can likewise be tilted and brought into any degree of proximity with reference to the front of the press.

The apparatus of the present invention is adaptable to the controls of air, steam or hydraulic presses by connecting the clutch control rod 22 to the air, steam or hydraulic controls, rather than to a clutch control. The apparatus is suitable for installation on shears, brakes and the like machines, as well as on punch presses.

As many apparently widely different embodiments of this invention may be made without departing from the spirit and scope thereof, it is to be understood that we do not limit ourselves to the specific embodiments herein.

What we claim is:

1. In a power machine having a frame, a work bed on the machine, a crankshaft on the frame, a reciprocating element on the frame connected to the crankshaft and movable thereby into and out of working relation in respect to said bed, a rotary element on the frame, clutch element including clutch control means for connecting the rotary element to the crankshaft and for thereafter automatically disconnecting them when the machine returns to open position, and operator actuated means adjacent an operator station for initiating actuation of the machine; the improvement comprising an electrical power source; light source means and photocell means arranged adjacent opposite positions of the machine and generally between the operator station and bed of the machine, said light source means being directed towards said photocell means so as to cast a screen of light through at least a planar area that must be intercepted by the operator in handling material into and out of the machine; a mechanical barrier movable generally edgewise from an out-of-the-way position to an intercepting position between the operator station and bed and between said light screen and bed; a solenoid operated barrier trip means for permitting said barrier to move to operator intercepting position; a barrier switch actuated synchronously with said crankshaft and closed when the reciprocating element moves away from fully open position with respect to said bed; electromagnetic connect and disconnect means for connecting and disconnecting the operator actuated means and the clutch element; a non-repeat switch for said electromagnetic connect and disconnect means connected to be actuated synchronously with said crankshaft and said switch being constructed so as to be closed when said reciprocating element is fully open with respect to the bed and to open when said element reciprocates from this position; a relay having a front contact, a back contact, and a contact movable to selectively engage the front or the back contact, a circuit including the barrier trip solenoid, the barrier switch and the front contact, said relay being normally energized in response to unintercepted light falling on said photocell means so as to condition for completion a circuit including the electric power source, said back contact, the non-repeat switch, and the electromagnetic connect and disconnect means which connects the operator actuated means and the clutch element, the non-repeat switch serving to complete this circuit when closed and said relay being non-energized when said light falling on the photocell is intercepted.

2. In a power driven machine such as a press, shear or the like, a power element, a work holding bed, a work forming element movable in response to movement of the power element and towards and away from the bed, said power element having an associated clutch and a manually operated clutch operator, said operator comprising a disconnect means positioned to render the operator ineffective to operate the clutch, a solenoid operatively associated with the disconnect means and being effective, upon de-energization thereof, to cause operation of the disconnect means so that the clutch operator cannot function, a normally open non-repeat timing switch, means operatively associated with the power element for closing said switch when the work forming element is in its retracted position, power supply conductors, said solenoid and switch being in series circuit with said conductors, whereby movement of the work forming element towards or away from the bed will permit said switch to open to de-energize the solenoid and operate the disconnect means of the clutch to provide a non-repeat operation of the machine, means to project a light ray across the zone wherein, normally, the hands of an operator are positioned during a work feeding step, a photoelectric cell positioned to be impinged by said ray, an electronic tube having a plate circuit and a grid circuit, a power supply conductor in series with the latter circuit, said cell being connected in the grid circuit, a relay having an operating coil in series with said plate circuit, and having a first fixed contact and an associated contact movable to engage the fixed contact in response to energization of the relay coil, whereby, upon interception of the light ray, the plate circuit current is reduced to de-energize the relay coil and open said contacts, the relay contacts being in series circuit with one of the power supply conductors, the disconnect solenoid and the timing switch, with the result that, when the work forming element is in its retracted position, any opening of the relay contacts due to light ray interception will open the circuit through the timing switch and through the disconnect solenoid and thereby ensure that the machine cannot again be started during work feeding operations while the hands of the operator are in a light ray intercepting work feeding position and with the work forming element in its retracted position, a guard barrier, means to move said barrier into its safety position, a barrier switch and a barrier trip solenoid, means for maintaining said barrier switch closed when the work forming element has moved from its retracted position, a second circuit in series with said barrier switch and said barrier solenoid, a second fixed contact on said relay in position to be engaged by the movable contact and being in series with the movable contact and the circuit to the barrier trip solenoid, whereby said latter solenoid will be energized to trip the barrier in response to de-energization of the relay due to light ray interception while the work-forming element is in an operating position and in motion.

3. In a machine as set forth in claim 2, a blanking circuit in shunt with the timing switch, a manually operated blanking switch in said circuit in shunt whereby, when desired, the blanking switch may be closed to disable the timing switch and permit successive machine operations so long as the clutch operator is held in its operative position.

4. In a machine as set forth in claim 2, wherein, failure of the power supply conductors to supply current to the plate circuit of the tube and to the relay coil in series therewith will permit the clutch disconnect solenoid to become de-energized at any position of the timing switch to ensure that the machine cannot be re-started even if the power supply motor might be energized.

5. In a machine as set forth in claim 2, wherein, the first fixed and the movable relay contacts are in series with a power supply conductor, the disconnect switch and the timing switch in the event of failure of the electronic tube, the latter thereby being unable to pass plate current through the relay coil to energize same, will permit the first fixed and movable relay contacts to open and to open the circuit through the disconnect solenoid to ensure that the machine cannot again be started.

6. In a power driven machine such as a press, shear or the like, a power element, a work holding bed, a work forming element movable in response to movement of the power element and towards and away from said bed, a guard barrier, means to project a light ray across the zone wherein, normally, the hands of an operator are positioned during a work feeding step, a photoelectric cell positioned to be impinged by said ray, an electronic tube having a plate circuit and a grid circuit, said cell being connected in the grid circuit, a relay having an operating coil connected in series with the plate circuit, said relay having a fixed front contact and a fixed back contact, the movable contact being in engagement with the front contact during energization of the relay coil, a safety device comprising a clutch and a clutch operating means, a solenoid adapted to be de-energized to disengage said clutch, a timing switch movable by said power element and being in a closed position when the work forming element is in its retracted position, a circuit in series with said timing switch, said solenoid and said front contact, said switch being in open position while the work forming element is in motion, a detent for said guard barrier, a coil for releasing said detent, a barrier switch movable in response to movement of the power element and being in an open position when the work forming element is in its retracted position, a circuit in series with said barrier switch and said release coil, whereby upon de-energization of the relay coil due to light ray interception during a work feeding operation, said front fixed contact will be permitted to open and thereby open the circuit through the solenoid to release the clutch operating means and prevent operation of the machine during the work feeding step but to permit a repeat operation of the machine upon energization of the clutch operating solenoid after the hands of the machine operator are withdrawn from light ray intercepting position.

7. In a machine as set forth in claim 6, wherein the fixed back contact becomes closed upon the movable contact during the tube de-energization by light ray interception to place the guard barrier control coil and its related barrier switch in series circuit therewith, whereby, if and when the last named switch has been closed by movement of the power element along its work forming stroke, said control coil becomes energized to permit movement of the guard barrier towards its safe position.

8. In a machine as set forth in claim 6 wherein, as long as the tube is energized, the first named contact will remain closed in its circuit with the associated timing switch, said last named switch serving, normally, as a non-repeat switch whereby said switch will be opened during each work forming stroke of the machine thereby to open the circuit of the control coil to cause operation of the disconnect means.

References Cited in the file of this patent

UNITED STATES PATENTS

| Number | Name | Date |
|---|---|---|
| 1,178,606 | Triem | Apr. 11, 1916 |
| 1,204,473 | Moore | Nov. 14, 1916 |
| 1,357,427 | Seyerle | Nov. 2, 1920 |
| 1,393,510 | Dubisky | Oct. 11, 1921 |
| 1,439,818 | Hordern | Dec. 26, 1922 |
| 1,556,954 | Polk | Oct. 13, 1925 |
| 1,815,152 | Klotz | July 21, 1931 |
| 1,962,742 | Jongedyk | June 12, 1934 |
| 2,082,210 | McMaster | June 1, 1937 |
| 2,115,322 | Wood | Apr. 26, 1938 |
| 2,270,968 | Riemenschneider | Jan. 27, 1942 |
| 2,311,441 | James | Feb. 16, 1943 |
| 2,407,891 | McKinstry | Sept. 17, 1946 |

FOREIGN PATENTS

| Number | Country | Date |
|---|---|---|
| 509,928 | Great Britain | July 21, 1939 |